United States Patent
Kawati et al.

(10) Patent No.: US 9,236,825 B2
(45) Date of Patent: Jan. 12, 2016

(54) VEHICLE CONTROL DEVICE AND CONTROL METHOD

(75) Inventors: Tomohiro Kawati, Fukuoka (JP); Akihiro Furukawa, Hiroshima (JP)

(73) Assignees: KABUSHIKI KAISHA YASKAWA DENKI, Fukuoka (JP); MAZDA MOTOR CORPORATION, Hiroshima (JP)

( * ) Notice: Subject to any disclaimer, the term of this patent is extended or adjusted under 35 U.S.C. 154(b) by 197 days.

(21) Appl. No.: 14/004,650

(22) PCT Filed: Feb. 3, 2012

(86) PCT No.: PCT/JP2012/000742
§ 371 (c)(1),
(2), (4) Date: Sep. 11, 2013

(87) PCT Pub. No.: WO2012/132188
PCT Pub. Date: Oct. 4, 2012

(65) Prior Publication Data
US 2014/0009097 A1    Jan. 9, 2014

(30) Foreign Application Priority Data
Mar. 31, 2011  (JP) .................................. 2011-078709

(51) Int. Cl.
*H02P 1/46*    (2006.01)
*H02P 25/18*   (2006.01)
(Continued)

(52) U.S. Cl.
CPC ................. *H02P 25/188* (2013.01); *B60L 7/14* (2013.01); *B60L 11/1803* (2013.01); *B60L 15/007* (2013.01); *B60L 15/2009* (2013.01); *B60L 2240/421* (2013.01); *B60L 2240/429* (2013.01); *Y02T 10/642* (2013.01); *Y02T 10/7005* (2013.01); *Y02T 10/7275* (2013.01)

(58) Field of Classification Search
CPC ............. B60K 31/00; H02P 3/00; H02P 5/00; H02P 23/0063
USPC ................................... 318/724, 122, 290, 376
See application file for complete search history.

(56) References Cited

U.S. PATENT DOCUMENTS 5,355,749 A    10/1994 Obara et al.
5,654,887 A     8/1997 Asa et al.
(Continued)

FOREIGN PATENT DOCUMENTS

JP    06-217596 A    8/1994
JP    06-225588 A    8/1994
(Continued)

*Primary Examiner* — Eduardo Colon Santana
*Assistant Examiner* — Bickey Dhakal
(74) *Attorney, Agent, or Firm* — Studebaker & Brackett PC (57) ABSTRACT

If a running range is selected, a current conduction mode of a motor is set to a low speed mode in which a current is conducted through a first and second windings, when a rotation speed of the motor is less than a threshold value, and is set to a high speed mode in which a current is conducted through only the first winding, when the rotation speed is equal to or greater than the threshold value. If a neutral range is selected, control of the inverter is stopped, and, a regeneration suppression control is executed to switch the current conduction mode to the high speed mode, not only in a higher-side speed range where the rotation speed is equal to or greater than the threshold value, but also in at least a part of a lower-side speed range where the rotation speed is less than the threshold value.

8 Claims, 7 Drawing Sheets

(51) Int. Cl.
*B60L 7/14* (2006.01)
*B60L 11/18* (2006.01)
*B60L 15/00* (2006.01)
*B60L 15/20* (2006.01)

(56) References Cited

U.S. PATENT DOCUMENTS 5,720,690 A * 2/1998 Hara et al. ............ 477/20
2010/0082191 A1 * 4/2010 Seo et al. ............ 701/22
2012/0221197 A1 * 8/2012 Hisada et al. ............ 701/36

FOREIGN PATENT DOCUMENTS

| | | |
|---|---|---|
| JP | 06-276607 A | 9/1994 |
| JP | H07-97176 A | 4/1995 |
| JP | 2010-088222 A | 4/2010 |

* cited by examiner

FIG. 7

VEHICLE CONTROL DEVICE AND CONTROL METHOD

TECHNICAL FIELD

The present invention relates to a control device for a vehicle in which a coupled state between a vehicle driving motor and each drive wheel is always maintained, and the motor operates as a generator during deceleration to perform deceleration regeneration (regeneration during vehicle deceleration).

BACKGROUND ART

In an electric vehicle using an electric motor as a running drive source, the motor operates as a generator during deceleration regeneration, so that a resulting regenerative electric power can be used for charging a battery, and the motor acts as resistance against rotation of drive wheels, that is, the motor can be utilized as a regenerative brake.

As disclosed, for example, in the following Patent Document 1, a three-phase motor is generally used as an electric vehicle driving motor. This three-phase motor is configured to be driven by an electric power which is supplied from a battery and subjected to DC-AC conversion through an inverter. On the other hand, during deceleration regeneration, the inverter functions as a converter to convert a regenerative electric power generated by the motor into a DC power, and supply the DC power to the battery.

The three-phase motor usable as a running drive source of an electric vehicle comprises a first winding and a second winding provided on a per-phase basis and connected in series. In some cases, this type of three-phase motor is used while being switched between two types of current conduction modes: a high speed mode in which a current is conducted through only the first winding for each phase; and a low speed mode in which a current is conducted through both of the first and second windings for each phase.

Specifically, when a current is conducted through only the first winding, a total number of turns in a current conduction line for each phase is reduced, and thereby an induced voltage to be produced in the motor becomes relatively low. This allows a current to more easily flow from the battery to the motor, so that the motor can be rotated at a high speed. On the other hand, when a current is conducted through both of the first and second windings, the total number of turns in the current conduction line for each phase is increased, and thereby the induced voltage to be produced in the motor becomes relatively high. Thus, the current flow from the battery to the motor is suppressed, so that the motor is rotated at a relatively low speed.

Meanwhile, in an electric vehicle equipped with this type of three-phase motor as a running drive source, during deceleration under a condition that a shift range is set in a running range, a braking force by regenerative braking and a regenerative electric power to be supplied from the motor to the battery are controlled by controlling the inverter.

On the other hand, for example, when a driver does not want to activate the regenerative braking, the vehicle can be decelerated under a condition that the shift range is set in a neutral range. In this case, generally, the inverter control is not executed because there is no need to perform the deceleration regeneration.

LIST OF PRIOR ART DOCUMENTS

Patent Documents

Patent Document 1: JP 06-225588A

SUMMARY OF THE INVENTION

Technical Problem

However, in an electric vehicle configured such that a motor for a running drive source and each drive wheel are coupled together without interposing any clutch therebetween, a coupled state therebetween is always maintained, so that, during deceleration under a neutral range, a resistance against rotation of drive wheels is produced in the motor, even though the inverter control is not executed. Thus, a braking force by regenerative braking is generated, and an induced voltage is produced in the motor.

Consequently, a driver feels odd against a situation where the regenerative braking is activated despite that the neutral range is selected. Moreover, in the above situation, when an induced voltage produced in the motor is greater than a voltage of the battery, a current is likely to flow from the motor to the battery via a diode of the inverter. That is, a current flows to the battery without being controlled by the inverter. This is undesirable in view of protection of the inverter, the battery and peripheral components.

It is therefore an object of the present invention to provide a vehicle control device capable of, in a vehicle where a coupled state between a motor for a running drive source and each drive wheel is always maintained, when the vehicle undergoes deceleration under a condition that a shift range is set in a neutral range, reducing driver's odd feeling against unexpected activation of regenerative braking, and effectively protecting an inverter, a battery and peripheral components.

Solution to the Technical Problem

In order to solve the above technical problem, a vehicle control device of the present invention is configured as follows.

The present invention is directed to a vehicle control device for controlling a vehicle which comprises: a battery; a vehicle driving motor having at least a first winding and a second winding mutually connected in series, wherein the motor is provided in such a manner that a coupled state with respect to drive wheels is always maintained; and an inverter provided between the battery and the motor and arranged to provide an electrical connection therebetween.

The vehicle control device comprises: an inverter controller for controlling the inverter; a current conduction mode switcher for switching a current conduction mode of the motor between a low speed mode in which a current is conducted through at least the first winding and the second winding, and a high speed mode in which a current is conducted through only the first winding; a motor speed detectordetector for detecting a rotation speed of the motor; a range detectordetector for detecting a shift range selected by a driver; and a switching controllercontroller for, under a condition that the shift range detected by the range detectordetector is a running range, controlling the current conduction mode switcher to switch the current conduction mode to the low speed mode when the rotation speed detected by the motor speed detectordetector is less than a given threshold value, and controlling the current conduction mode switcher to switch the current conduction mode to the high speed mode when the rotation speed detected by the motor speed detectordetector is equal to or greater than the given threshold value. The inverter controllercontroller is operable, when a neutral range is detected by the range detectordetector, to stop the control of the inverter; and the switching controllercontroller is operable, when the neutral range is detected by the range detectordetector, to execute a regeneration suppression control to switch the current conduction mode to the high speed mode, not only in a higher-side speed range where the rotation speed of the motor is equal to or greater than the given threshold value, but also in at least a part of a lower-side speed range where the rotation speed of the motor is less than the given threshold value.

The present invention is also directed to a vehicle control method for controlling a vehicle which comprises: a battery; a vehicle driving motor having at least a first winding and a second winding mutually connected in series, wherein the motor is provided in such a manner that a coupled state with respect to drive wheels is always maintained; and an inverter provided between the battery and the motor and arranged to provide an electrical connection therebetween. The vehicle control method comprises: a first step of detecting a rotation speed of the motor; a second step of detecting a shift range selected by a driver; a third step of, under a condition that the shift range detected in the second step is a running range, switching a current conduction mode of the motor to a low speed mode in which a current is conducted through at least the first winding and the second winding, when the rotation speed of the motor detected in the first step is less than a given threshold value, and switching the current conduction mode to a high speed mode in which a current is conducted through only the first winding, when the detected rotation speed of the motor is equal to or greater than the given threshold value; and a fourth step of, under a condition that the shift range detected in the second step is a neutral range, stopping control of the inverter, and executing a regeneration suppression control to switch the current conduction mode to the high speed mode, not only in a higher-side speed range where the rotation speed of the motor is equal to or greater than the given threshold value, but also in at least a part of a lower-side speed range where the rotation speed of the motor is less than the given threshold value.

Effect of the Invention

In the vehicle where the coupled state between the motor for a running drive source and each drive wheel is always maintained, the present invention makes it possible to, when the vehicle undergoes deceleration under the condition that the shift range is set in the neutral range, reduce driver's odd feeling against unexpected activation of regenerative braking, and effectively protect the inverter, the battery and peripheral components. Thus, the present invention is suitably usable in an industrial field for producing the vehicle where the coupled state between the motor for a running drive source and each drive wheel is always maintained.

DESCRIPTION OF EMBODIMENTS

With reference to the accompanying drawings, the present invention will now be described in detail.

[First Embodiment]

Figure 1:
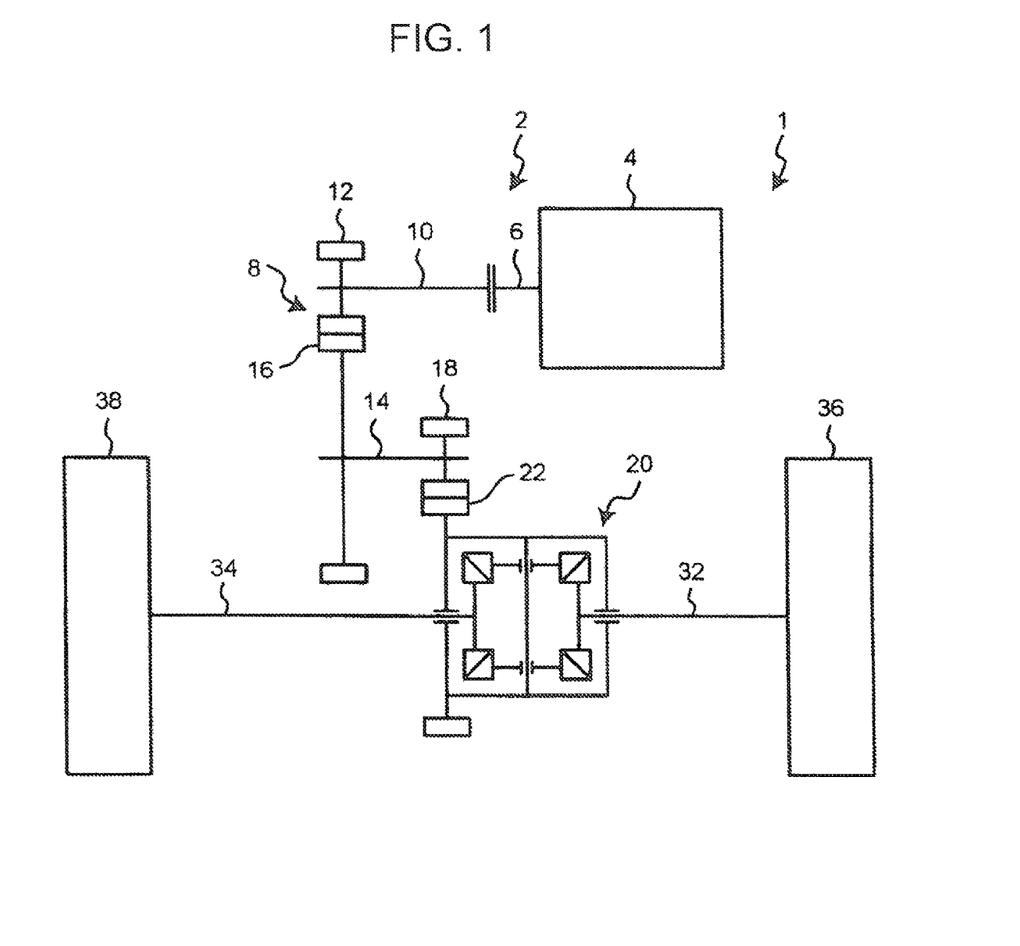
FIG. 1 is a skeleton diagram illustrating a drive line of an electric vehicle equipped with a vehicle control device according to a first embodiment of the present invention.

A vehicle control device according to a first embodiment of the present invention is mounted on an electric vehicle 1 having a drive line 2 illustrated in FIG. 1.

As illustrated in FIG. 1, the electric vehicle 1 comprises an electric motor 4 (hereinafter referred to simply as "motor 4") as a running drive source, and an output shaft 6 of the motor 4 and an input shaft 10 of a speed reducer 8 are coaxially arranged and mutually coupled together. An output shaft 14 of the speed reducer 8 is disposed parallel to the input shaft 10, and a drive gear 12 provided on the input shaft 10 is meshed with a driven gear 16 formed to have a diameter greater than that of the drive gear 12 and provided on the output shaft 14. Thus, the speed reducer 8 is operable to transmit a rotation of the input shaft 10 to the output shaft 14, while reducing a rotational speed of the input shaft 10.

The output shaft 14 of the speed reducer 8 is further provided with an output gear 18 which is meshed with an input gear 22 of a differential unit 20 formed to have a diameter greater than that of the output gear 18. Thus, a rotation of the output shaft 14 of the speed reducer 8 is input into the differential unit 20 while being further reduced in speed, and then transmitted to two drive wheels 36, 38 via respective axels 32, 34 extending from the differential unit 20 in a right-left direction.

As above, in the drive line 2, the motor 4 and each of the drive wheels 36, 38 is coupled together without interposing any clutch therebetween, so that a coupled state therebetween is always maintained.

Figure 2:
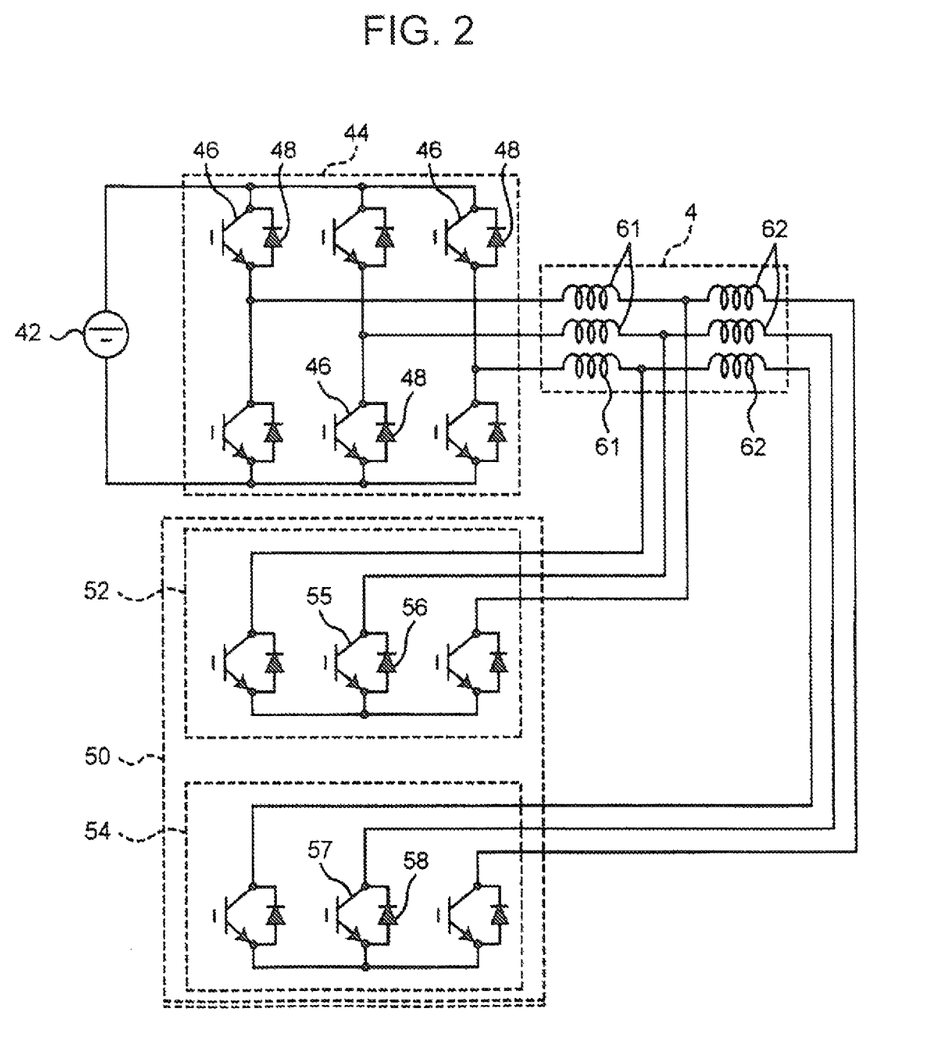
FIG. 2 is a diagram illustrating an electric circuit connecting between a motor for a running drive motor and a battery.

As illustrated in FIG. 2, the motor 4 is a three-phase motor configured to be driven by an alternating current, and is provided with a first winding 61 and a second winding 62 mutually connected in series on a per-phase basis.

The motor 4 (more specifically, the first winding 61 for each phase in the motor 4) is electrically connected to a battery 42 via an inverter 44.

The inverter 44 comprises, as semiconductor devices, a plurality of switching devices 46 each composed, for example, of IGBT, and a plurality of rectifying devices 48 each composed, for example, of a diode. Through the inverter 44, a supply electric power from the battery 42 to the motor 4 is converted from DC power to AC power, and a regenerative electric power from the motor 4 to the battery 42 is converted from AC power to DC power. Control of the inverter 44 is executed by an aftermentioned control unit 40.

A current conduction mode switching unit 50 (current conduction mode switcher) is connected to the motor 4. The current conduction mode switching unit 50 is operable to switch a current conduction mode of the motor 4 between a low speed mode in which a current is conducted through the first windings 61 and the second windings 62, and a high speed mode in which a current is conducted through only the first windings 61. Such a current conduction mode switching operation by the current conduction mode switching unit 50 is controlled by the aftermentioned control unit 40.

The current conduction mode switching unit 50 comprises a high speed-side current conduction section 52 connected to the three phases of the motor 4 at positions between each of three sets of the first winding 61 and the second winding 62, and a low speed-side current conduction section 54 connected to the three phases of the motor 4 at ends of the second wirings 62 on a side opposite to the first windings 61. Each of the current conduction sections 52, 54 comprises, as semiconductor devices, a plurality of sets of a switching device 55 (57) composed, for example, of IGBT, and a rectifying device 56 (58) composed, for example, of a diode, correspondingly to the respective phases.

During the high speed mode, the high speed-side current conduction section 52 is set in an ON state, and the low speed-side current conduction section 54 is set in an OFF state, so that a current is conducted through only the high speed-side current conduction section 52 in the current conduction mode switching unit 50, and thereby a current is conducted through only the first windings 61 in the motor 4. On the other hand, during the low speed mode, the high speed-side current conduction section 52 is set in an OFF state, and the low speed-side current conduction section 54 is set in an ON state, so that a current is conducted through only the low speed-side current conduction section 54 in the current conduction mode switching unit 50, and thereby a current is conducted through the first windings 61 and the second windings 62 in the motor 4.

Thus, during the high speed mode, a total number of turns in a current conduction line for each phase of the motor 4 is reduced, and thereby an induced voltage to be produced in the motor 4 becomes lower, as compared to the low speed mode. This allows a current to more easily flow from the battery 42 to the motor 4, so that the motor 4 can be rotated at a high speed. On the other hand, in the low speed mode, the total number of turns in the current conduction line for each phase of the motor 4 is increased, and thereby the induced voltage to be produced in the motor becomes higher. Thus, the current flow from the battery 42 to the motor 4 is suppressed, so that the motor 4 is rotated at a relatively low speed.

Figure 3:
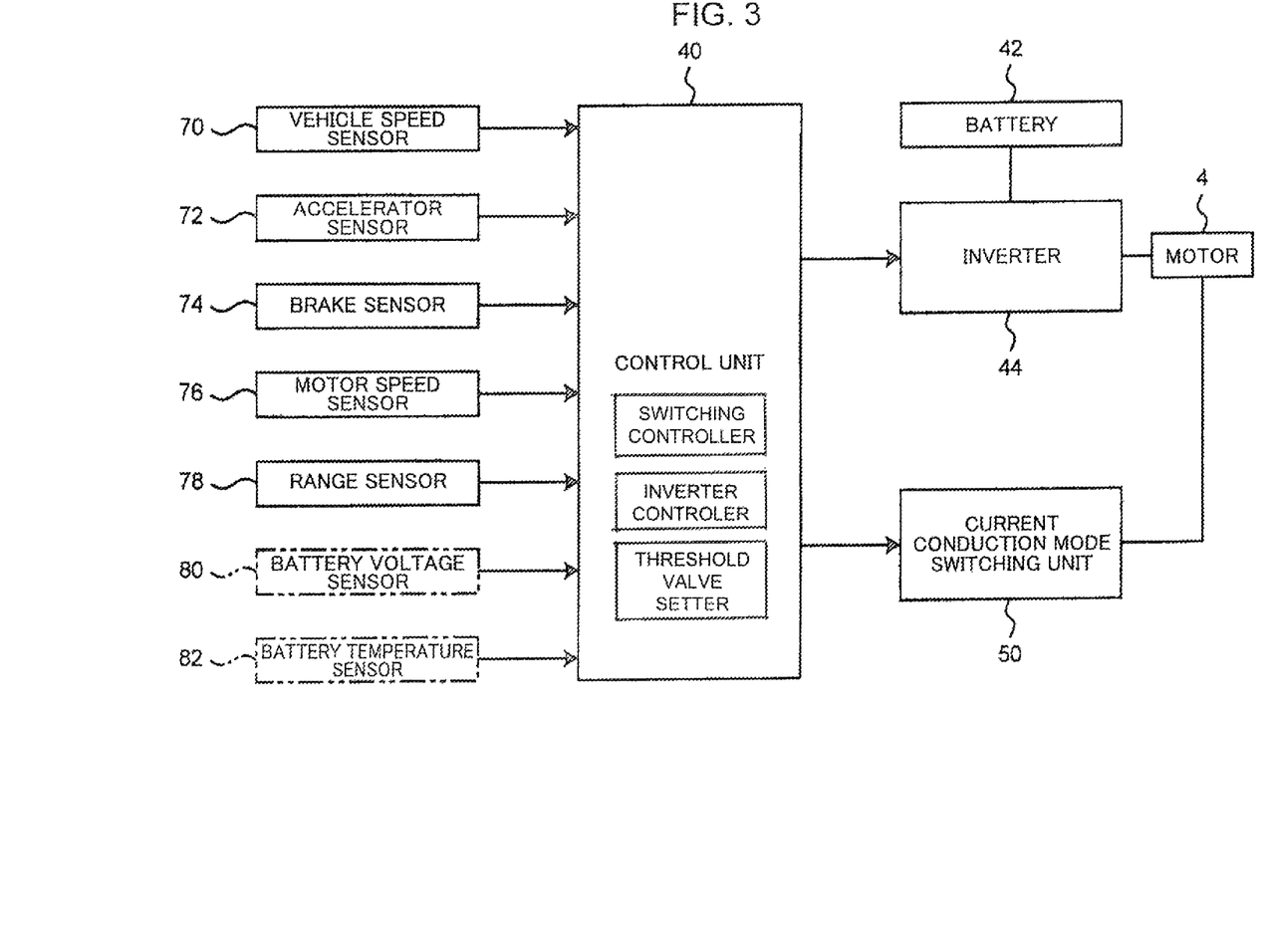
FIG. 3 is a block diagram illustrating a control system of the electric vehicle.

A control unit 40 illustrated in FIG. 3 controls the inverter 44 and the current conduction mode switching unit 50. That is, the control unit 40 has both a function as an inverter controllercontroller for controlling the inverter 44, and a function as a switching controllercontroller for controlling the current conduction mode switching unit 50 (current conduction mode switcher).

As illustrated in FIG. 3, the control unit 40 is configured to receive signal inputs from a vehicle speed sensor 70 for detecting a running speed of the electric vehicle 1, an accelerator sensor 72 for detecting a depression amount of an accelerator pedal, a brake sensor 74 for detecting a depression amount of a brake pedal, a motor speed sensor 76 (motor speed detectordetector) for detecting a rotation speed of the motor 4, and a range sensor 78 (range detectordetector) for detecting a shift range selected by a driver.

In addition to the sensors 70, 72, 74, 76, 78, FIG. 3 illustrates a battery voltage sensor 80 (battery voltage detectordetector) for detecting a voltage of the battery 42, and a battery temperature sensor 82 (battery temperature detectordetector) for detecting a temperature of the battery 42, in respective blocks indicated by two-dot chain lines. However, the two sensors are used in an aftermentioned different embodiment, but not necessarily essential for the first embodiment.

The control unit 40 performs computational processing based on signals sent from the above sensors, and outputs control signals to the inverter 44 and the current conduction mode switching unit 50.

The inverter 44 is controlled by the control unit 40 to control a current flow between the battery 42 and the motor 4, i.e., the supply electric power from the battery 42 to the motor 4 and the regenerative electric power from the motor 4 to the battery 42, depending on vehicle driving conditions and others.

The current conduction mode switching unit 50 is controlled by the control unit 40 to switch the current conduction mode of the motor 4 between the low speed mode and the high speed. Specifically, the current conduction mode switching unit 50 is controlled to switch the current conduction mode to the low speed mode when the rotation speed detected by the motor speed sensor 76 is less than a given threshold value n, and switch the current conduction mode to the high speed mode when the rotation speed detected by the motor speed sensor 76 is equal to or greater than the threshold value n.

However, the detection of the rotation speed of the motor 4 is not necessarily performed based on an output signal from the motor speed sensor 76, but may be performed based on a control signal from the control unit 40 to the motor 4.

The shift range to be selected by a driver includes a running range such as a D range, and a neutral range (N range). When the running range is selected, the control unit 40 controls the inverter 44 to allow a current proportional to the accelerator pedal depression amount to be supplied to the motor 4 via the inverter 44. Thus, the motor 4 is driven, and a resulting driving force is transmitted to the drive wheels 36, 38. On the other hand, when the N range is selected, the control unit 40 is stops the control of the inverter 44. That is, the current supply to the motor 4 via the inverter 44 is stopped to stop the driving of the motor 4.

Meanwhile, the N range is not always selected only during vehicle stop, but also selected during vehicle deceleration, in some cases. However, no clutch is provided in the drive line 2 of the electric vehicle 1 in the first embodiment, and thereby a coupled state between the motor 4 and each of the drive wheels 36, 38 is always maintained, despite that the N range is selected. Thus, during deceleration under the N range, even when the control of the inverter 44 is stopped, the motor 4 acts to resist rotation of the drive wheels 36, 38, so that a braking force, called "regenerative braking force", is generated, and an induced voltage is produced in the motor 4.

Consequently, a driver feels odd against a situation where the regenerative braking is activated despite that the N range is selected. Moreover, when the induced voltage produced in the motor 4 is greater than a voltage of the battery 42, a current flows from the motor 4 to the battery 42 via the rectifying devices of the inverter 44, without being controlled by the inverter 44. This is undesirable in view of protection of the inverter 44, the battery 42 and peripheral components.

In view of this problem, when the N range is detected by the range sensor 78, the control unit 40 switches the current conduction mode of the motor 4 to the high speed mode, as a regeneration suppression control for suppressing the deceleration regeneration. When the current conduction mode of the motor 4 is switched to the high speed mode in accordance with execution of the regeneration suppression control, a current is conducted through the first windings 61 in the motor 4, so that a total number of turns in a current conduction line for each phase of the motor 4 is reduced as compared with the case where a current is conducted through both of the first winding 61 and the second winding 62. This suppresses the induced voltage in the motor 4 and thus a current which flows from the motor 4 toward the battery 42, during deceleration. Under a condition that the motor speed is constant, the induced voltage of the motor 4 has a value proportional to the number of turns of an armature winding (the first winding 61, the second winding 62). Supposing that each of that the first winding 61 and the second winding 62 has the same number of turns, in the high speed mode, a value of the induced voltage of the motor 4 can be reduced to half of that in the low speed mode, and therefore a control range of the rotation speed of the motor 4 can be expanded.

In view of protection of the inverter 44, the battery 42 and peripheral components, it is preferable to reliably eliminate a current which flows from the motor 4 toward the battery 42, when the current conduction mode is set to the high speed mode by the regeneration suppression control. For this purpose, the motor 4 is preferably configured such that, when the current conduction mode is in the high speed mode, the induced voltage to be produced in the motor 4 is always less than the voltage of the battery 42.

As above, during deceleration under the N range, the regeneration suppression control is executed to suppress the resistance of the motor against rotation of the drive wheels 36, 38 and thus the braking force by the regenerative braking, so that it becomes possible to reduce driver's odd feeling against unexpected activation of regenerative braking. Further, in the above situation, it becomes possible to suppress a current which flows from the motor 4 toward the battery 42 without being controlled by the inverter 44, thereby effectively protecting the inverter 44, the battery 42 and peripheral components.

Based on the flowchart in FIG. 4, the switching control of the current conduction mode of the motor 4 during running of the electric vehicle 1 will be specifically described below.

Figure 4:
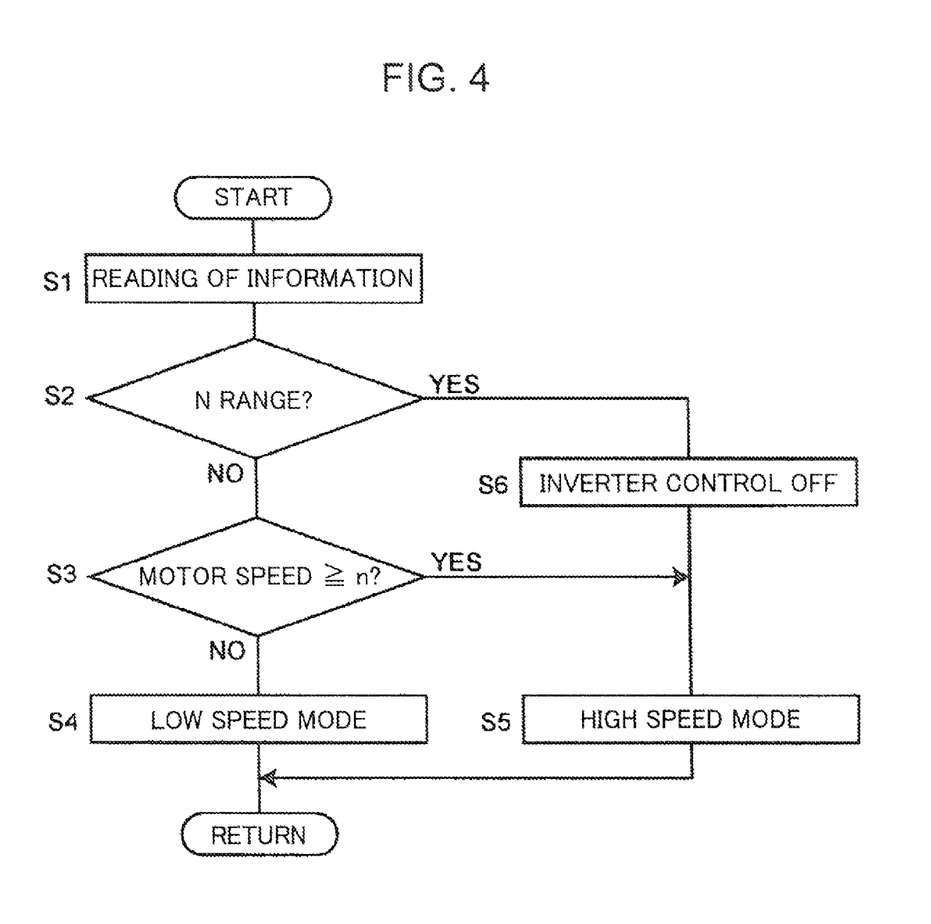
FIG. 4 is a flowchart illustrating a control flow in switching control for a current conduction mode of the motor, to be executed during running of the electric vehicle.

In a control operation illustrated in FIG. 4, first of all, in Step S1, based on input signals into the control unit 40, respective output values of the motor speed sensor 76 and the range sensor 78 are read.

In the next Step S2, based on the output value of the range sensor 78 read in the Step S1, it is determined whether or not the shift range is the N range.

As a result of the determination in the Step S2, when the shift range is not the N range, i.e., is the running range such as the D range, a normal switching control according to the rotation speed of the motor 4 is executed in Steps S3 to S5. Specifically, in the Step S3, based on the output value of the motor speed sensor 76 read in the Step S1, it is determined whether or not the rotation speed of the motor 4 is equal to or greater than the threshold value n. As a result of the determination in the Step S3, when the rotation speed of the motor 4 is equal to or greater than the threshold value n, the current conduction mode switching unit 50 is controlled to switch the current conduction mode of the motor 4 to the high speed mode (Step S5), and, when the rotation speed of the motor 4 is less than the threshold value n, the current conduction mode switching unit 50 is controlled to switch the current conduction mode of the motor 4 to the low speed mode (Step S4).

On the other hand, as a result of the determination in the Step S2, when the shift range is the N range, the control of the inverter 44 is stopped (Step S6), and the current conduction mode switching unit 50 is controlled to switch the current conduction mode of the motor 4 to the high speed mode, according to the regeneration suppression control (Step S5). Specifically, in the first embodiment, the regeneration suppression control is executed to switch the current conduction mode to the high speed mode, not only in a higher-side speed range where the rotation speed of the motor 4 is equal to or greater than the threshold value n, but also in a lower-side speed range where the rotation speed of the motor 4 is less than the threshold value n. Thus, when the shift range is the N range, the high speed mode is selected in the entire speed range of the motor 4 (i.e., irrespective of the rotation speed of the motor 4).

The regeneration suppression control (Step S5) is executed in the above manner. Thus, when the vehicle 1 is decelerated under the condition where the N range is selected, the deceleration regeneration is suppressed, so that it becomes possible to reduce driver's odd feeling against activation of regenerative braking, and suppress a current which flows from the motor 4 to the battery 42 without being controlled by the inverter 44, thereby effectively protecting the inverter 44, the battery 42 and peripheral components.

Figure 5:
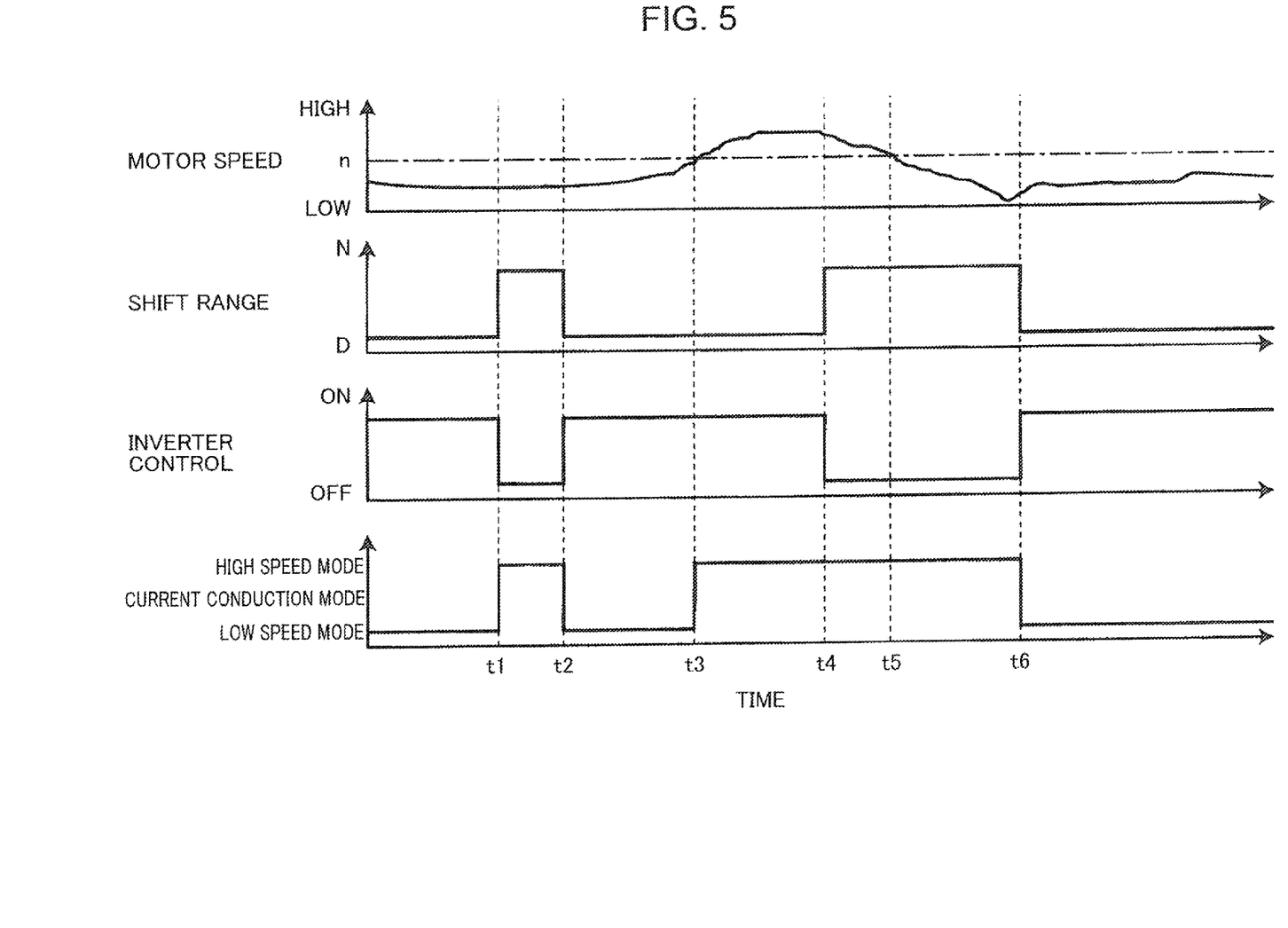
FIG. 5 is a time chart illustrating one example of a temporal change of the current conduction mode of the motor, to be controlled according to the flow illustrated in FIG. 4.

FIG. 5 illustrates one example of a temporal change of the current conduction mode of the motor 4, during the control operation illustrated in FIG. 4.

In an initial state illustrated in FIG. 5, the vehicle 1 is running at a low vehicle speed under a condition that the D range is selected, wherein the current conduction mode of the motor 4 is the low speed mode, and the control of the inverter 44 is executed.

Then, when the shift range is switched to the N range at Time t1, the control of the inverter 44 is stopped (Step S6 in FIG. 4), and the regeneration suppression control for switching the current conduction mode of the motor 4 to the high speed mode is executed (Step S5 in FIG. 4). The regeneration suppression control makes it possible to suppress the braking force by the regeneration braking, while suppressing the current flow from the motor 4 to the battery 42.

Then, when the shift range is returned to the D range at Time t2, the control of the inverter 44 is restarted, and the regeneration suppression control is terminated, so that the current conduction mode of the motor 4 is returned to the low speed mode. Consequently, the motor is driven according to the normal control.

Subsequently, when the rotation speed of the motor 4 rises and reaches the threshold value n at Time t3, the current conduction mode of the motor 4 is switched to the high speed mode according to the normal switching control (Step S5 in FIG. 4).

Then, when the shift range is re-switched to the N range at Time t4, the control of the inverter 44 is stopped (Step S6 in FIG. 4), and the current conduction mode of the motor 4 is kept in the high speed mode according to the regeneration suppression control.

Subsequently, the rotation speed of the motor 4 gradually decreases and falls below the threshold value n at Time t5. However, the regeneration suppression control is continued because the shift range is still set in the N range, so that the current conduction mode of the motor 4 is kept in the high speed mode without being switched to the low speed mode (Step S5 in FIG. 4). This makes it possible to continuously suppress the electric power regeneration from the motor 4 to the battery 42, and the braking force by the regeneration braking.

Then, when the shift range is switched to the D range at Time t6, the control of the inverter 44 is restarted, and the regeneration suppression control is terminated, so that the current conduction mode of the motor 4 is switched to the low speed mode, and the motor 4 is driven according to the normal control.

[Second Embodiment]

A second embodiment of the present invention will be described below. An electric vehicle 1 in the second embodiment is provided with a battery voltage sensor 80 (FIG. 3) for detecting a voltage of the battery 42. Except for this point, the electric vehicle has fundamentally the same structure as that in the first embodiment.

Figure 6:
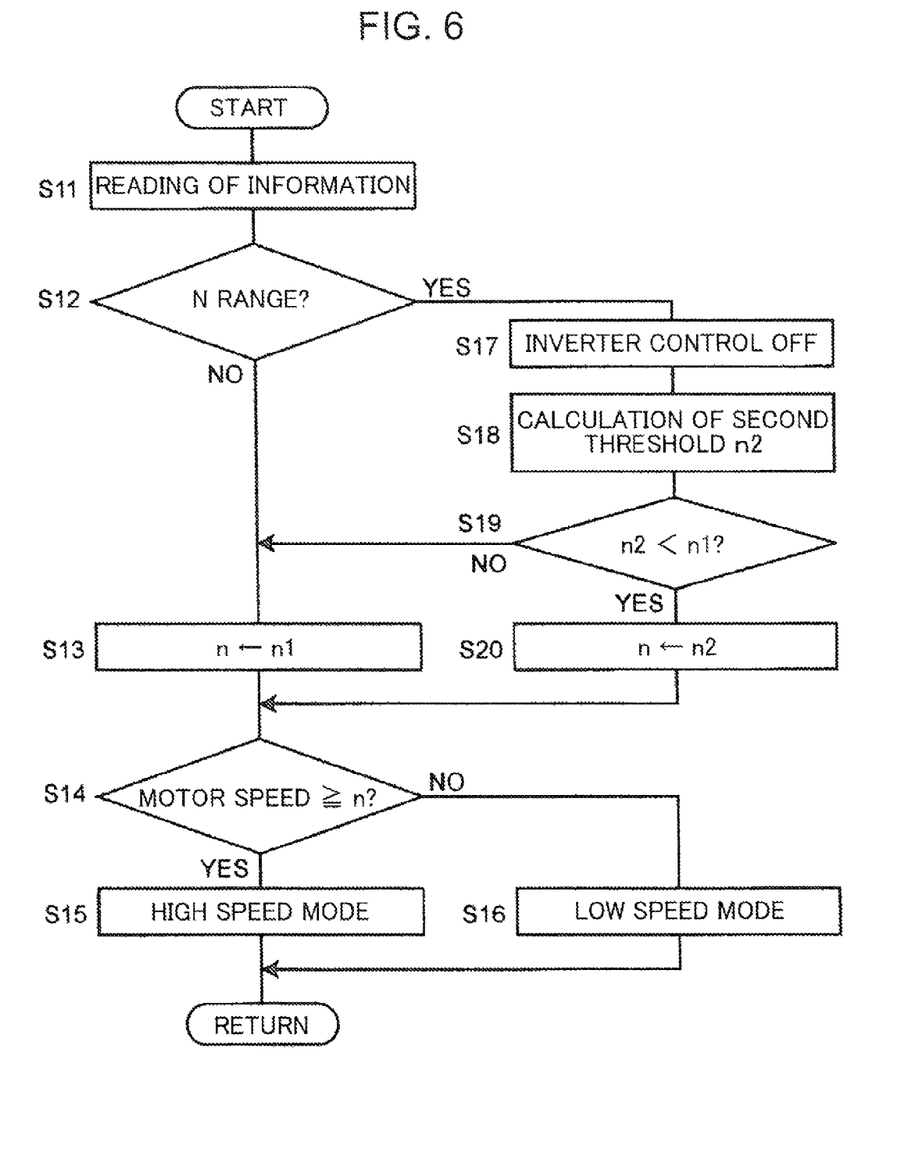
FIG. 6 is a diagram for explaining a second embodiment of the present invention, specifically, a flowchart illustrating a control flow in switching control for a current conduction mode of a motor, to be executed during running of an electric vehicle.

FIG. 6 is a flowchart illustrating details of a switching control for a current conduction mode to be executed during running of the electric vehicle 1, in the second embodiment.

In a control operation illustrated in FIG. 6, first of all, in Step S11, based on input signals into the control unit 40, respective output values of the motor speed sensor 76, the range sensor 78 and the battery voltage sensor 80 are read.

In the next Step S12, based on the output value of the range sensor 78 read in the Step S11, it is determined whether or not the shift range is the N range.

As a result of the determination in the Step S2, when the shift range is not the N range, i.e., is the running range such as the D range, the normal switching control according to the rotation speed of the motor 4 is executed in Steps S13 to S15. Specifically, in the Step S13, a first threshold value n1 is set as a threshold value serving as a criterion n for determination on switching of the current conduction mode of the motor 4. The first threshold value n1 may be a predetermined fixed value, or may be a value which is changed depending on vehicle driving conditions. In the next Step S14, based on the output value of the motor speed sensor 76 read in the Step S11, it is determined whether or not the rotation speed of the motor 4 is equal to or greater than the first threshold value n1. As a result of the determination in the Step S14, when the rotation speed of the motor 4 is equal to or greater than the first threshold value n1, the current conduction mode switching unit 50 is controlled to switch the current conduction mode of the motor 4 to the high speed mode (Step S15), and, when the rotation speed of the motor 4 is less than the first threshold value n1, the current conduction mode switching unit 50 is controlled to switch the current conduction mode of the motor 4 to the low speed mode (Step S16).

On the other hand, as a result of the determination in the Step S12, when the shift range is the N range, the control of the inverter 44 is stopped (Step S17). Then, only if a further condition is satisfied, the regeneration suppression control is executed.

Specifically, in the second embodiment, separately from the first threshold value n1 (see the Step S13), a second threshold value n2 is set by the control unit 40, as a threshold value (regeneration suppression threshold value) serving as a criterion for determination on execution of the regeneration suppression control (Steps S18 to S20), and the regeneration suppression control is executed only when the second threshold value n2 is less than the first threshold value n1. That is, when the second threshold value n2 is less than the first threshold value n1, the current conduction mode is switched to the high speed mode, not only in a higher-side speed range where the rotation speed of the motor 4 is equal to or greater than the first threshold value n1, but also in at a part of a lower-side speed range (in a speed range between the second threshold value n2 and the first threshold value n1), which leads to suppression of the deceleration regeneration.

In the control in the second embodiment, even when the shift range is set in the N range, the current conduction mode is not switched to the high speed mode unless the rotation speed of the motor is equal to or greater than the second threshold value n2. In contrast, when the rotation speed of the motor 4 is less than the second threshold value n2, i.e., when it is expected that the induced voltage to be produced in the motor is sufficiently less than the voltage of the battery 42 even if the current conduction mode of the motor 4 is kept in the low speed mode, the current conduction mode is kept in the low speed mode. This makes it possible to avoid unnecessary switching to the high speed mode, thereby reducing the frequency of switching of the current conduction mode.

The setting of the second threshold value n2 will be specifically described. First of all, in Step S18, the second threshold value n2 is calculated based on the voltage of the battery 42. In this step, the second threshold value n2 is calculated as a value which becomes smaller as the voltage detected by the battery voltage sensor 80 becomes lower. Thus, the second threshold value n2 is calculated as a value which becomes smaller as the voltage of the battery 42 becomes lower, i.e., a current becomes more likely to flow from the motor 4 to the battery 42, so that the regeneration suppression control becomes more likely to be executed. In this way, the second threshold value n2 is variably set depending on the voltage of the battery 42, so that it becomes possible to achieve a balance between the reduction in frequency of switching of the current conduction mode of the motor 4 and the suppression of the deceleration regeneration.

In the next Step S19, it is determined whether or not the second threshold value n2 calculated in the Step S18 is less than the first threshold value n1, i.e., whether or not the second threshold value n2 is a value suitable as the regeneration suppression threshold value.

As a result of the determination in the Step S19, when the second threshold value n2 is equal to or greater than the first threshold value n1, the second threshold value n2 is unsuitable as the regeneration suppression threshold value. Therefore, as the threshold value n serving as a criterion for determination on switching of the current conduction mode, the first threshold value n1 is employed, instead of the second threshold value n2 (Step S13), and the current conduction mode is switched on the basis of the first threshold value n1 (Steps S14 to S16). This control is not different from the normal switching control to be executed when the shift range is a range other than the N range (running range such as the D range), and therefore does not fall under the category of the regeneration suppression control for suppressing the deceleration regeneration.

On the other hand, as a result of the determination in the Step S19, when the second threshold value n2 is less than the first threshold value n1, the second threshold value n2 is suitable as the regeneration suppression threshold value, and therefore employed as the current conduction mode switching threshold value n (Step S20). Then, it is determined whether or not the rotation speed of the motor 4 is equal to or greater than the second threshold value n2 (Step S14). As a result of the determination, only when the rotation speed of the motor 4 is equal to or greater than the second threshold value n2, the current conduction mode of the motor 4 is set to the high speed mode (Step S15). In this way, the second threshold value n2 less than the first threshold value n1 as a threshold to be set in a normal state (when the shift range is the running range) is set, and the current conduction mode is switched to the high speed mode when the rotation speed of the motor 4 is equal to or greater than the second threshold value n2. This expands a rotation speed range in which the current conduction mode is set to the high speed mode, thereby leading to an increase in frequency of the high speed mode. Thus, this control (switching control to the high speed mode in Step S15) falls under the category of the regeneration suppression control for suppressing the deceleration regeneration.

As above, in the second embodiment, it becomes possible to omit unnecessary regeneration suppression control according to the voltage of the battery 42, thereby reducing the frequency of switching of the current conduction mode of the motor 4, and execute the regeneration suppression control when required, thereby suppressing the electric power regeneration from the motor 4 to the battery 42 and the braking force by the regeneration braking, as in the first embodiment.

Figure 7:
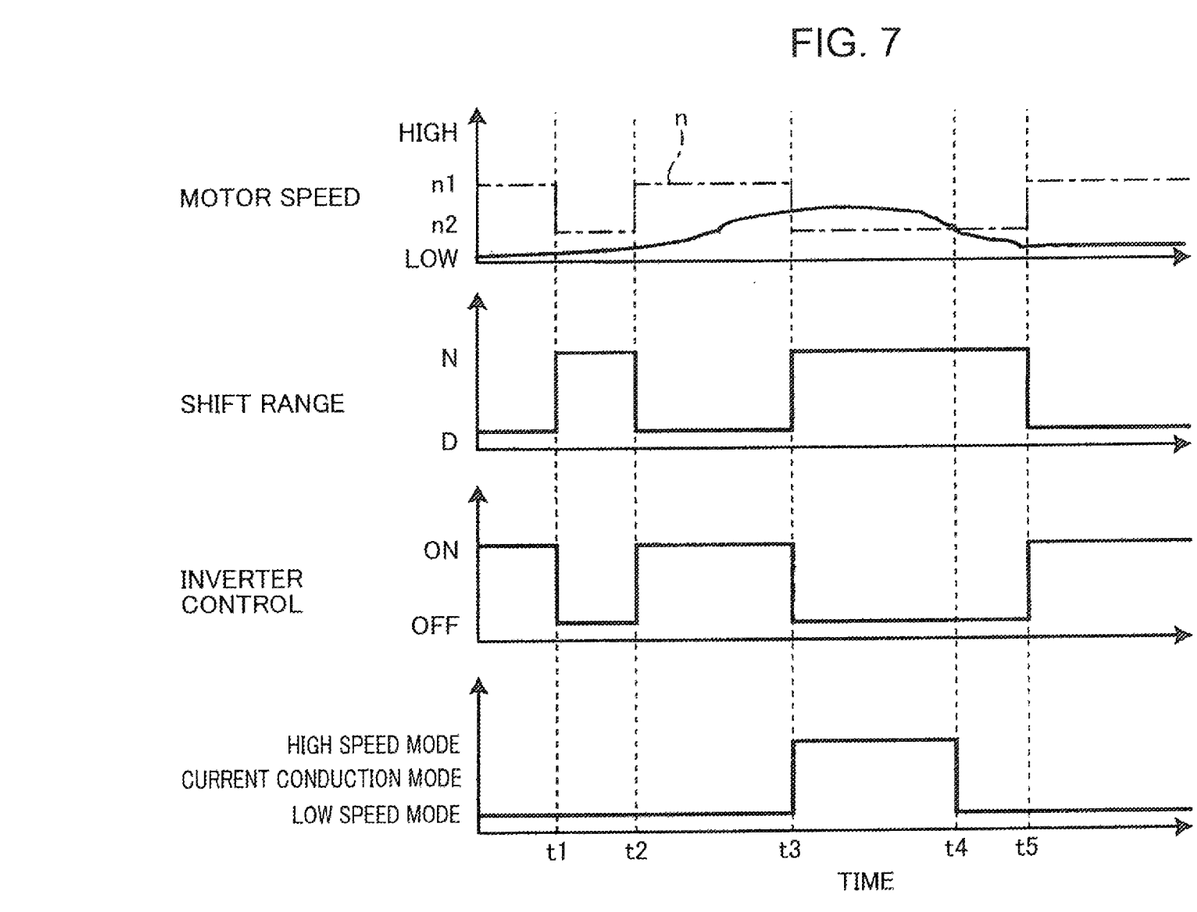
FIG. 7 is a time chart illustrating one example of a temporal change of the current conduction mode of the motor, to be controlled according to the flow illustrated in FIG. 6.

FIG. 7 illustrates one example of a temporal change of the current conduction mode of the motor 4, during the control operation illustrated in FIG. 6.

In an initial state illustrated in FIG. 7, the vehicle 1 is running at a low vehicle speed under a condition that the D range is selected, and the current conduction mode switching threshold value n is set to the first threshold value n1. Further, the current conduction mode of the motor 4 is the low speed mode, and the control of the inverter 44 is executed.

Then, when the shift range is switched to the N range at Time t1, the control of the inverter 44 is stopped (Step S17 in FIG. 6), and the current conduction mode switching threshold value n is changed from the first threshold value n1 to the second threshold value n2 (<n1) (Step S20 in FIG. 6). However, at this time point, the current conduction mode of the motor 4 is kept in the low speed mode, because the rotation speed of the motor 4 is less than the second threshold value n2. This reduces the frequency of switching of the current conduction mode.

Then, at Time t2, the shift range is returned to the D range. Therefore, the control of the inverter 44 is restarted, and the current conduction mode switching threshold value is returned to the first threshold value n1 (Step S13 in FIG. 6).

Subsequently, the rotation speed of the motor 4 rises and exceeds the second threshold value n2, but does not reach the first threshold value n1. Thus, the current conduction mode of the motor 4 is still kept in the low speed mode.

Then, at Time t3, the shift range is re-switched to the N range. Therefore, the control of the inverter 44 is re-stopped (Step S17 in FIG. 6), and the current conduction mode switching threshold value n is re-changed to the second threshold value n2 (Step S20 in FIG. 6). At this time point, the rotation speed of the motor 4 is greater than the second threshold value n2, and thereby the current conduction mode of the motor 4 is switched to the high speed mode (Step S15 in FIG. 6). In this way, the second threshold value n2 less than the first threshold value n1 to be set in a normal state is set, and the current conduction mode is switched to the high speed mode in a speed range equal to or greater than the second threshold value n2, so that after the Time t3, the regeneration suppression control is effectively executed, thereby suppressing the electric power regeneration from the motor 4 to the battery 42 and the braking force by the regeneration braking, Subsequently, when the rotation speed of the motor 4 decreases and falls below the second threshold value n2 at Time t4, the current conduction mode of the motor 4 is returned to the low speed mode, and the regeneration suppression control is terminated (Step S16 in FIG. 6).

Then, when the shift range is returned to the D range at Time t5, the control of the inverter 44 is restarted, and the current conduction mode switching threshold value n is returned to the first threshold value n1. At this time point, the rotation speed of the motor 4 is less than the first threshold value n1, and the current conduction mode of the motor 4 is originally set to the low speed mode, so that no switching of the current conduction mode is performed.

As above, the present invention has been described based on the above embodiments, it is to be understood that the present invention is not limited to the embodiments.

For example, in the first embodiment, when the shift range is the N range, the regeneration suppression control is executed to switch the current conduction mode to the high speed mode, irrespective of the rotation speed (in the entire speed range) of the motor 4. On the other hand, in the second embodiment, when the shift range is the N range, the regeneration suppression control is executed to switch the current conduction mode to the high speed mode, only in a speed range where the rotation speed of the motor 4 is equal to or greater than the second threshold value n2. However, in another embodiment of the present invention, the regeneration suppression control (control for switching the current conduction mode to the high speed mode, in the entire speed range of the motor or in the speed range equal to or greater than the second threshold value n2) may be executed, when a condition that the shift range is the N range, and a condition that the voltage of the battery 42 detected by the battery voltage sensor 80 is less than a given voltage value, are satisfied. In this case, the regeneration suppression control is executed only when the voltage of the battery 42 is less than the given voltage value, and thereby a current is more likely to flow from the motor 4 to the battery 42, so that unnecessary switching to the high speed mode is suppressed. In this way, only when required, the current conduction mode is switched to the high speed mode according to the voltage of the battery 42, thereby making it possible to suppress unnecessary electric power regeneration and regenerative braking.

Further, in yet another embodiment of the present invention, the regeneration suppression control may be executed, when a condition that the shift range is the N range, and a condition that a temperature of the battery 42 detected by a battery temperature sensor 82 (FIG. 3) is equal to or greater than a given temperature value, are satisfied. In this case, when the temperature of the battery 42 is equal to or greater than the given temperature value, and therefore it is necessary to avoid a further rise in temperature of the battery, the regeneration suppression control can suppress charging of regenerative electric power to the battery 42, thereby suppressing a rise in temperature of the battery 42 due to charging.

The above embodiments have been described based on an example in which a winding of the motor 4 is composed of two divided pieces: the first winding 61; and the second winding 62. Alternatively, the present invention can also be applied to the case where a winding of the motor 4 is composed of three or more divided pieces.

Further, the present invention is not limited to the electric vehicle, but may also be applied to a hybrid vehicle.

Next, a characteristic configuration disclosed in the above embodiments and functions/effects based on the configuration will be described below.

A vehicle control device is applied to a vehicle which comprises: a battery (42); a vehicle driving motor (4) having at least a first winding (61) and a second winding (62) mutually connected in series, wherein the motor (4) is provided in such a manner that a coupled state with respect to drive wheels (36, 38) is always maintained; and an inverter (44) provided between the battery (42) and the motor (4) and arranged to provide an electrical connection therebetween. The vehicle control device comprises: an inverter controller (40) for controlling the inverter (44); a current conduction mode switching means (50) for switching a current conduction mode of the motor (4) between a low speed mode in which a current is conducted through at least the first winding (61) and the second winding (62), and a high speed mode in which a current is conducted through only the first winding (61); a motor speed detector (76) for detecting a rotation speed of the motor (4); a range detector (78) for detecting a shift range selected by a driver; and a switching controller (40) for, under a condition that the shift range detected by the range detector (78) is a running range, controlling the current conduction mode switching means (50) to switch the current conduction mode to the low speed mode when the rotation speed detected by the motor speed detector (76) is less than a given threshold value (n), and controlling the current conduction mode switching means (50) to switch the current conduction mode to the high speed mode when the rotation speed detected by the motor speed detector (76) is equal to or greater than the given threshold value (n). The inverter controller (40) is operable, when a neutral range is detected by the range detector, to stop the control of the inverter; and the switching controller (40) is operable, when the neutral range is detected by the range detector (78), to execute a regeneration suppression control to switch the current conduction mode to the high speed mode, not only in a higher-side speed range where the rotation speed of the motor (4) is equal to or greater than the given threshold value (n), but also in at least a part of a lower-side speed range where the rotation speed of the motor (4) is less than the given threshold value (n).

According to this feature, when the shift range is the neutral range, the current conduction mode of the vehicle driving motor is set to the high speed mode, in a wider speed range. In addition, a current is conducted through only the first winding in the serially-connected first and second windings of the motor, so that a total number of turns in a current conduction line of the motor becomes relatively small. This suppresses an induced voltage in the motor and thus a current which flows from the motor toward the battery, during deceleration. Thus, it becomes possible to, during deceleration under the neutral range, suppress a resistance of the motor against rotation of the drive wheels and thus a braking force by regenerative braking, thereby reducing driver's odd feeling against unexpected activation of regenerative braking. Further, in the above situation, it becomes possible to suppress a current which flows from the motor toward the battery without being controlled by the inverter, thereby effectively protecting the inverter, the battery and peripheral components.

Preferably, the switching controller (40) is operable, when the neutral range is detected by the range detector (78), to execute the regeneration suppression control to switch the current conduction mode to the high speed mode, irrespective of the rotation speed of the motor (4).

The current conduction mode may be switched to the high speed mode, irrespective of the rotation speed of the motor (in the entire speed range of the motor), in the above manner. In this case, it becomes possible to, during deceleration under the N range, reliably suppress a regenerative electric power to be charged from the motor to the battery and a braking force by the regenerative braking.

More preferably, in this vehicle control device, the switching controller (40) is operable, when a shifting from the running range to the neutral range is detected by the range detector, under a condition that the current conduction mode is the high speed mode, to keep the current conduction mode in the high speed mode, even after the rotation speed detected by the motor speed detector (76) is reduced to be less than the threshold value (n).

According to this feature, when the shift range is switched from the running range to the neutral range under the condition that the current conduction mode is the high speed mode, even if, after the switching, the rotation speed of the motor is reduced to become less than the threshold value, the current conduction mode is kept in the high speed mode, so that it becomes possible to prevent a rise in induced voltage to be produced in the motor, and continuously suppress the electric power regeneration from the motor to the battery and the braking force by the regeneration braking.

Preferably, the above vehicle control device further comprises a threshold value setter (40) for, when a shifting from the running range to the neutral range is detected by the range detector (78), setting a regeneration suppression threshold value (n2) serving as a criterion for determination on execution of the regeneration suppression control, wherein the switching controller (40) is operable, when the neutral range is detected by the range detector (78), and the regeneration suppression threshold value (n2) set by the threshold value setter (40) is less than the given threshold value (n1), to execute the regeneration suppression control to switch the current conduction mode to the high speed mode, in a speed range where the rotation speed of the motor (4) is equal to or greater than the regeneration suppression threshold value (n2).

According to this feature, when the shift range is switched from the running range to the neutral range, the regeneration suppression threshold value is set, separately from the current conduction mode switching threshold value (given threshold value). It is expected that, when the regeneration suppression threshold value is less than the given threshold value, and the rotation speed of the motor is less than the regeneration suppression threshold value, the induced voltage to be produced in the motor becomes less than a voltage of the battery even if the current conduction mode is kept in the low speed mode. Therefore, in this condition, the current conduction mode is kept in the low speed mode. This makes it possible to avoid unnecessary switching to the high speed mode, thereby reducing a frequency of switching of the current conduction mode. On the other hand, when the shift range is the neutral range, and the rotation speed of the motor is equal to or greater than the regeneration suppression threshold value, the current conduction mode is set to the high speed mode, so that it becomes possible to suppress the electric power regeneration from the motor to the battery and the braking force by the regeneration braking.

More preferably, this vehicle control device comprises a battery voltage detector (80) for detecting a voltage of the battery (42), wherein the threshold value setter (40) is operable to set the regeneration suppression threshold value (n2) to a smaller value as the voltage detected by the battery voltage detector (80) becomes lower.

According to this feature, the regeneration suppression threshold value is set to a lower value as the voltage of the battery becomes lower, i.e., a current becomes more likely to flow from the motor to the battery, so that the regeneration suppression control becomes more likely to be executed. Thus, it becomes possible to achieve a balance between reduction in frequency of switching of the current conduction mode and suppression of deceleration regeneration.

Preferably, the above vehicle control device comprises a battery voltage detector (80) for detecting a voltage of the battery (42), wherein the switching controller (40) is operable, when the neutral range is detected by the range detector (78), and the voltage detected by the battery voltage detector (80) is less than a given voltage value, to execute the regeneration suppression control.

According to this feature, the regeneration suppression control is executed, only when the voltage of the battery is less than the given voltage value and thereby a current is more likely to flow from the motor to the battery, under the condition that the shift range is the neutral range. Thus, the current conduction mode is switched to the high speed mode when required, according to the voltage of the battery 42, while suppressing unnecessary switching to the high speed mode, so that it becomes possible to suppress unnecessary electric power regeneration and regenerative braking.

Preferably, the above vehicle control device comprises a battery temperature detector (82) for detecting a temperature of the battery, wherein the switching controller (40) is operable, when the neutral range is detected by the range detector (78), and the temperature detected by the battery temperature detector (82) is equal to or greater than a given temperature value, to execute the regeneration suppression control.

According to this feature, when the temperature of the battery is equal to or greater than the given temperature value, and therefore it is necessary to avoid a further rise in temperature of the battery, the regeneration suppression control is executed to suppress battery charging by regenerative electric power. This makes it possible to suppress a rise in temperature of the battery due to the charging, thereby suppressing degradation of the battery due to excessive temperature rise.

What is claimed is:

1. A vehicle control device for controlling a vehicle which comprises: a battery; a vehicle driving motor having at least a first winding and a second winding mutually connected in series, the motor being provided in such a manner that a coupled state with respect to drive wheels is always maintained; and an inverter provided between the battery and the motor and arranged to provide an electrical connection therebetween, the vehicle control device comprising:
   an inverter controller for controlling the inverter;
   a current conduction mode switcher for switching a current conduction mode of the motor between a low speed mode in which a current is conducted through at least the first winding and the second winding, and a high speed mode in which a current is conducted through only the first winding;
   a motor speed detector for detecting a rotation speed of the motor;
   a range detector for detecting a shift range selected by a driver; and
   a switching controller for, under a condition that the shift range detected by the range detector is a running range, controlling the current conduction mode switcher to switch the current conduction mode to the low speed mode when the rotation speed detected by the motor speed detector is less than a given threshold value, and controlling the current conduction mode switcher to switch the current conduction mode to the high speed mode when the rotation speed detected by the motor speed detector is equal to or greater than the given threshold value,
   wherein
   the inverter controller is operable, when a neutral range is detected by the range detector, to stop the control of the inverter; and
   the switching controller is operable, when the neutral range is detected by the range detector, to execute a regeneration suppression control to switch the current conduction mode to the high speed mode, not only in a higher-side speed range where the rotation speed of the motor is equal to or greater than the given threshold value, but also in at least a part of a lower-side speed range where the rotation speed of the motor is less than the given threshold value.

2. The vehicle control device as defined in claim 1, wherein the switching controller is operable, when the neutral range is detected by the range detector, to execute the regeneration suppression control to switch the current conduction mode to the high speed mode, irrespective of the rotation speed of the motor.

3. The vehicle control device as defined in claim 1, further comprising a threshold value setter for, when a shifting from the running range to the neutral range is detected by the range detector, setting a regeneration suppression threshold value serving as a criterion for determination on execution of the regeneration suppression control, wherein
   the switching controller is operable, when the neutral range is detected by the range detector, and the regeneration suppression threshold value set by the threshold value setter is less than the given threshold value, to execute the regeneration suppression control to switch the current conduction mode to the high speed mode, in a speed range where the rotation speed of the motor is equal to or greater than the regeneration suppression threshold value.

4. The vehicle control device as defined in claim 1, further comprising a battery voltage detector for detecting a voltage of the battery, wherein
   the switching controller is operable, when the neutral range is detected by the range detector, and the voltage detected by the battery voltage detector is less than a given voltage value, to execute the regeneration suppression control.

5. The vehicle control device as defined in claim 1, further comprising a battery temperature detector for detecting a temperature of the battery, wherein
   the switching controller is operable, when the neutral range is detected by the range detector, and the temperature detected by the battery temperature detector is equal to or greater than a given temperature value, to execute the regeneration suppression control.

6. The vehicle control device as defined in claim 2, wherein the switching controller is operable, when a shifting from the running range to the neutral range is detected by the range detector, under a condition that the current conduction mode is the high speed mode, to keep the current conduction mode in the high speed mode, even after the rotation speed detected by the motor speed detector is reduced to be less than the threshold value.

7. The vehicle control device as defined in claim 3, further comprising a battery voltage detector for detecting a voltage of the battery, wherein
   the threshold value setter is operable to set the regeneration suppression threshold value to a smaller value as the voltage detected by the battery voltage detector becomes lower.

8. A vehicle control method for controlling a vehicle which comprises:
   a battery; a vehicle driving motor having at least a first winding and a second winding mutually connected in series, the motor being provided in such a manner that a coupled state with respect to drive wheels is always maintained; and an inverter provided between the battery and the motor and arranged to provide an electrical connection therebetween, the vehicle control method comprising:
   a first step of detecting a rotation speed of the motor;
   a second step of detecting a shift range selected by a driver;
   a third step of, under a condition that the shift range detected in the second step is a running range, switching a current conduction mode of the motor to a low speed mode in which a current is conducted through at least the first winding and the second winding, when the rotation speed of the motor detected in the first step is less than a given threshold value, and switching the current conduction mode to a high speed mode in which a current is conducted through only the first winding, when the detected rotation speed of the motor is equal to or greater than the given threshold value; and a fourth step of, under a condition that the shift range detected in the second step is a neutral range, stopping control of the inverter, and executing a regeneration suppression control to switch the current conduction mode to the high speed mode, not only in a higher-side speed range where the rotation speed of the motor is equal to or greater than the given threshold value, but also in at least a part of a lower-side speed range where the rotation speed of the motor is less than the given threshold value.

\* \* \* \* \*